June 26, 1956

G. CURRIE 2,752,010

SINGLE ADJUSTMENT BRAKE

Filed Oct. 3, 1951

WITNESSES:

INVENTOR
Gilbert Currie.
BY
ATTORNEY

June 26, 1956 G. CURRIE 2,752,010
SINGLE ADJUSTMENT BRAKE
Filed Oct. 3, 1951 3 Sheets-Sheet 3

WITNESSES:

INVENTOR
Gilbert Currie.
BY
ATTORNEY

United States Patent Office 2,752,010
Patented June 26, 1956

2,752,010

SINGLE ADJUSTMENT BRAKE

Gilbert Currie, Williamsville, N. Y., assignor to Westinghouse Electric Corporation, East Pittsburgh, Pa., a corporation of Pennsylvania Application October 3, 1951, Serial No. 249,498

16 Claims. (Cl. 188—171)

This invention relates generally to brakes and is particularly directed to a brake which compensates misalignment of parts and requires but a single adjustment when once put into operation.

In certain of its aspects, this invention is related to a copending application of the applicants, Serial No. 249,497, filed on the same date as this application, entitled Brake and assigned to the assignee of this invention.

This invention, in one form of embodiment, is illustrated in connection with an electric brake of the double block type in which a spring applies the braking torque and a solenoid or electromagnet operating against the spring or braking torque, moves the brake to disengaged position.

In the usual case, double block brakes comprise a brake wheel and have brake arms on opposite sides of the brake wheel, which carry the brake shoes at their extremities. The brake is set by a compression spring and a link system connecting the free extremities of the brake arms. This forces the brake arms together, and the brake is usually released by means of a bell crank having its middle fulcrum on the brake arm extremity adjacent the compression spring, and one end thereof attached to the link. Force applied in the proper direction to the remaining extremity of the bell crank, drives the free extremities of the brake arms apart and releases the brake. Frequently on double block brakes, the bell crank is actuated by a solenoid.

Most brakes of this general type have three adjustments, one for varying the torque, and hence for varying the braking and releasing effort by varying the amount of spring compression, one for equalizing the shoe clearances, usually by means of separate adjustments on the shoes, and the third for adjusting the stroke or travel of the solenoid or electromagnet plunger or armature.

While these adjustments may vary for different types of brakes, they are essentially the same. In the typical case, after the brake is mounted in position, it is necessary to make most, and usually all of these adjustments, and the successful operation of the brake depends upon the skill with which the adjustments are made.

These adjustments, under ideal working conditions, ordinarily require a fair degree of skill to obtain the most efficient operation of the brake. In many instances, however, brakes are installed in out-of-the-way places where lighting is poor and where the space is cramped. Under these conditions, it is extremely difficult to make the three adjustments hereinabove mentioned. In such instances, the brake is usually always out of adjustment and maximum operating efficiency is, therefore, not obtained.

Initial adjustments, however, hold only for the initial thickness of the brake shoe lining. As the brake is used and the linings are worn, the brake is continuously moving out of adjustment. When the lining has worn an amount equal to the initial shoe clearances, the travel of the armature or solenoid plunger has been doubled, and it is usually necessary to readjust the brake to restore the travel to its original amount. If the adjustments are not made at the proper time, or are not properly made, brake failures evidenced in excessive heating and burned out solenoid coil may result.

Due to the facility of adjustment of the brake of this invention at the time of manufacture, and due to the fact that according to this invention, but a single adjustment is required to restore the brake to proper operating condition, it will be appreciated that brake failures may be minimized with a minimum of maintenance time and effort. Moreover, in accordance with another feature of this invention, movement of certain specified parts of the brake to given limit positions may be utilized by either suitable, visual, or audible indicating means, to signal the operator that brake adjustment is required.

In accordance with the foregoing considerations, it is generally one object of this invention to provide a brake of the character briefly referred to, which is simple in its elements with respect to operational requirements and consistant in its operation.

It is also a general object of this invention to provide a brake of the character referred to, which requires but a single adjustment to place the brake in proper operating condition.

More specifically, with regard to the preceding object, it is another object of this invention to provide a brake of the character referred to which is electromagnetically operated wherein said single adjustment may be made either with the electromagnet energized or deenergized.

Still more specifically it is an object of this invention to provide an electromagnetically operated brake wherein, with the magnet energized, a single adjusting screw may be turned until the brake shoes rub on the brake wheel and then turned in a reverse direction to disengage the shoes from the brake wheel, and with the magnet deenergized and the wheel locked by the brake shoes, the single adjusting screw may be turned in a direction to effect adjustment of the armature of the electromagnet with respect to the core therefor, and further wherein said last-named adjustment may also be made by turning said single adjusting screw in a direction to engage the armature of the magnet with the core therefor and thereafter reversely turning said adjusting screw to space said armature from said core a predetermined amount.

According to another feature of this invention, it is also an object to provide a brake in which misalignment of the brake wheel with respect to the center line of the brake assembly is automatically compensated.

Stated otherwise, with regard to the preceding object, it is also an object of this invention to provide a brake such that factory adjustment of the brake with the brake wheel in one position is not affected by location of the brake wheel in another position with respect to the brake shoes when the brake is installed.

A more specific object of this invention is to provide a brake of the class generally referred to in which movement of the solenoid plunger or electromagnet armature in releasing the brake is always confined to the same definite path, which is unaffected by the wear of the brake lining, to thereby eliminate side pull on the plunger or armature.

The foregoing statements are merely illustrative of the various aims and objects of this invention. Other objects and advantages will become apparent from a study of the following specification, when considered in conjunction with the accompanying drawings, in which.

Figure 1:
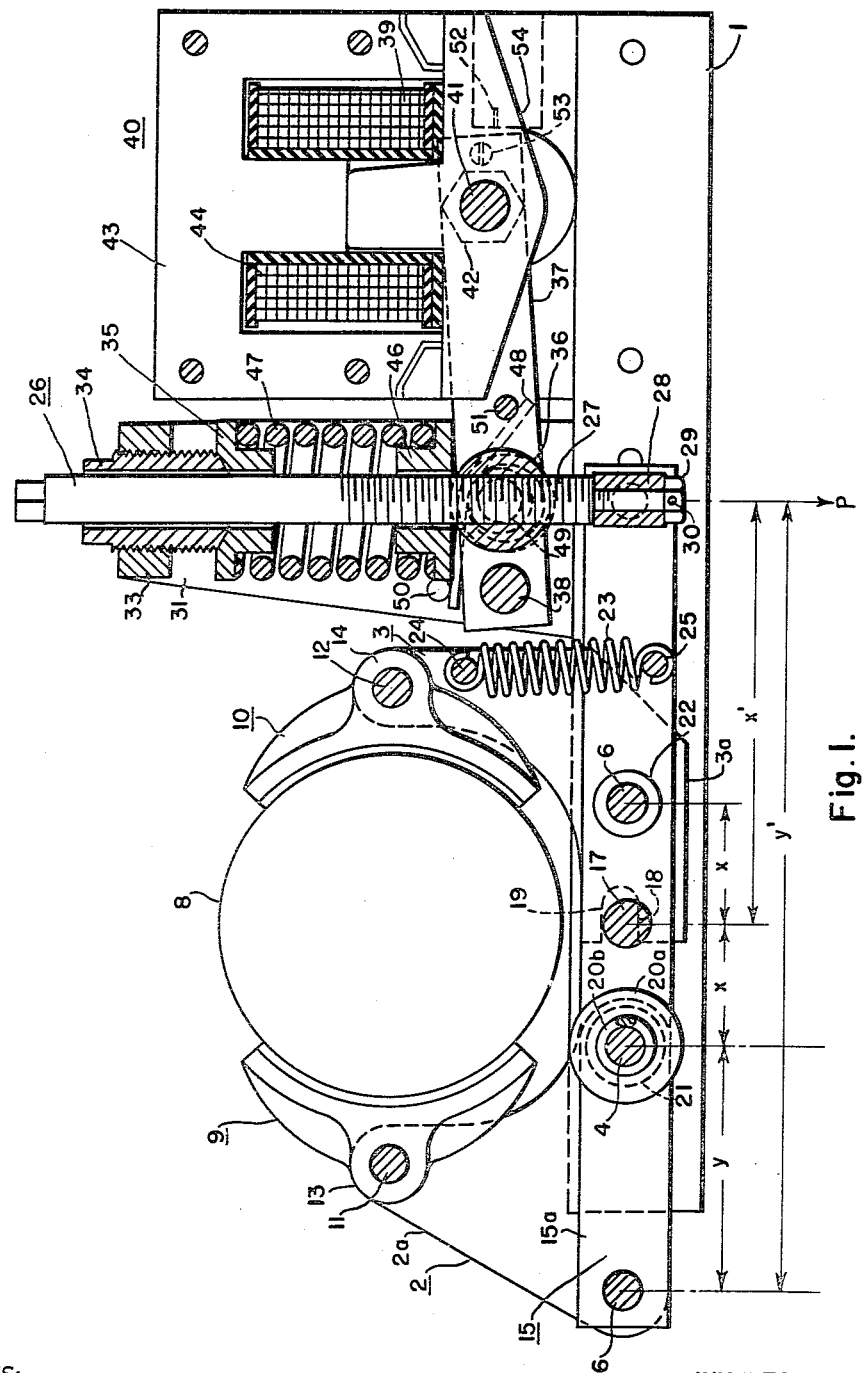
Figure 1 is a longitudinal sectional view of a brake assembly embodying the features of this invention.

The various components of the brake assembly are mounted upon a support or base section comprising a pair of spaced parallel angles 1. These angles are suitably spaced apart to receive therebetween the various levers of the brake linkage system. At the left hand end of the base of the brake, as viewed in Figures 1 and 2, there are mounted two brake arm assemblies, generally designated 2 and 3. These brake arm assemblies comprise a pair of similar levers, are respectively designated 2a and 2b, and 3a and 3b. Brake arm levers 2a and 2b are pivotally connected between the vertical flanges of the base angles by means of a shaft 4, provided with reduced diameter, threaded end sections, which clear through suitable positioned holes in the mentioned vertical flanges of the base section, and which are secured by means of nuts 5, which thread thereover. Brake arms 3a and 3b are similarly pivotally secured between the vertical flanges of the base angles by means of a shaft 6, the ends of which extend through the vertical flanges and have threaded thereover nuts 7. These brake arm assembly pivot mountings, for the respective brake arm assemblies, are arranged in suitably spaced relation along the base section and as seen in Figure 1, vertical extensions of the brake arms project upwardly on each side of a brake wheel 8. Brake shoes 9 and 10 are respectively pivotally connected to the upper extremities of the respective brake arm assemblies 2 and 3 by means of respective pivot pins 11 and 12, which extend through respective bosses 13 and 14 on the brake shoes and engage the upper ends of the respective levers of the brake arm assemblies. As a general rule, sufficient frictional restraint in this pivotal mounting of the brake shoes on the brake arms is provided so that the shoes do not rotate due to their own weight, whenever the brake arms are moved to brake released position. The brake shoes are properly aligned by movement of the brake arms to a position in which the brake shoes engage the wheel. The frictional restraint is overcome due to the force of this engagement and the brake shoes are properly oriented with respect to the wheel, and maintain this position in the brake released position.

A lever assembly, generally designated 15, is connected to each brake arm assembly at a point on each assembly which is displaced from the respective points of pivoting of the brake arm assemblies on the base. The point of connection of lever assembly 15, with brake arm assembly 2 is designated 16, which is represented in a pin extending through both sections 15a and 15b of lever 15, and terminating in the respective levers 2a and 2b of brake arm assembly 2. A pin 17, which extends through, and is secured in both lever sections 15a and 15b of the lever assembly 15, is provided with a flat bottom face 18, and the vertical dimension seen in Figure 1, of the respective ends of the pin is such as to fit into and slidably engage the edges of respective slots 19, provided in the remaining corresponding extremities of the brake arm assembly 3.

Figure 2:
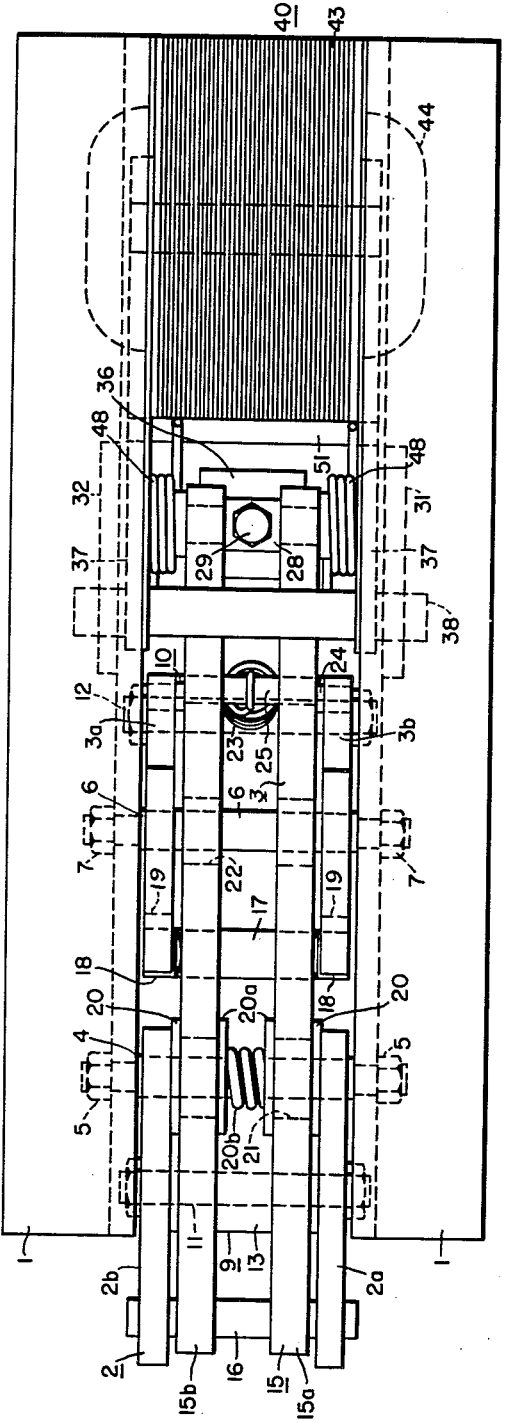
Figure 2 is a bottom view of Figure 1, illustrating certain details of the brake linkage.

As will be seen by reference to both Figure 1 and Figure 2, lever assembly 15, comprises a pair of spaced, parallel straight bars 15a and 15b, of rectangular cross section, for reasons of structural simplicity. In view of this, provision is made through respective holes 21 and 22 in this lever assembly to clear the brake arm pivot pins 4 and 5. Thus it will be appreciated that angular movement of lever assembly 15 is obtainable within the limits imposed by the clearance of the respective holes 21 and 22 about the respective pivot pins 4 and 5.

Since it is desirable in operation of the brake to minimize conditions of back lash due to lost motion in certain of the connections, a spring 23 is connected between pins 24 and 25 respectively mounted on lever assembly 15, and brake arm assembly 3. This spring is under tension and consequently tends to move the pins 24 and 25 together. In so doing, the brake arm assembly 3 is biased clockwise as viewed in Figure 1 to a position in which the bottom edge of the slot 19 abuts the flat face 18 on the bottom side of pin 17. Also, cross member 28 whose ends are pivotally carried by lever assembly 15, is biased upwardly against the shoulder on spindle 26.

A frictional connection is provided between the lever assembly 15 and brake arm assembly 2 for the purpose of providing an adjustable connection of lever assembly 15 with brake arm assembly 2 through which limited torque may be applied to actuate the brake arm assembly 2 in a direction to release the brake shoe 9 from the wheel, but which yet provides for relative angular movement between the lever assembly 15 and brake arm assembly 2, when the lever assembly is moved clockwise as viewed in Figure 1 to apply the brake shoes to the wheel. This frictional connection comprises a pair of friction washers or plates 20, which are respectively disposed between the adjacent levers of the brake arm assembly 2 and the lever assembly 15, and further comprises a pair of spring washers 20a, disposed between the adjacent faces of levers 15a and 15b. A compression spring 20b disposed between these washers thrusts the levers 15a and 15b apart as seen in Figure 2 and securely engages the respective levers with the respective friction plates or washers 20.

With the construction thus far described, if a downward force is exerted on the right end of lever assembly 15, the lever assembly will tend to pivot about the center of shaft 4 due to the friction device just described and will move in a clockwise direction as viewed in Figure 1. Pin 17 will, therefore, tend to move downwardly and pin 16 will tend to move upwardly. These forces cause the respective brake arm assemblies to rotate about their respective pivot pins 4 and 6, brake arm assembly 2 rotating clockwise and brake arm assembly 3 rotating counterclockwise, to apply the respective shoes to the brake wheel. Since the holes 21 and 22 in lever assembly 15 are provided, it will be appreciated that this small clockwise movement of the lever assembly will not be obstructed by the respective brake arm assembly pivot pins 4 and 6.

For a particular location of the wheel, for example, a location of the wheel exactly on the designed center line of the brake, as shown in Figure 1, the lever assembly 15 at the time the brake shoes engage the brake wheel will occupy a given angular position with respect to the respective brake arms. However, if the brake wheel should be to the right or to the left of this particular position, the lever assembly 15 would occupy a different angular position with respect to the brake arms than that which is illustrated. Under these conditions, the angular relationship of the lever assembly 15 with respect to brake arm assembly 2 must change in an amount dictated by the degree of misalignment and this is physically possible since the braking force which is applied to the right end of the lever assembly 15 is sufficient to overcome the friction between lever assembly 15 and brake arm assembly 2.

It will thus be appreciated that braking torque is applied to the brake arms through the connection of the lever system 15 to the respective brake arms at the two points 16 and 17. By proper selection of the various lever arms which are involved in this mechanical linkage, it is possible to obtain equal braking torques.

It is desirable that any misalignment of the brake wheel with respect to the designed center line of the brake wheel, resulting in angular displacement of the lever assembly 15, shall not result in vertical displacement of the right end of this lever assembly. If such vertical displacement occurs, due to such misalignment, the travel of the brake engaging and brake releasing mechanism is changed to some new value. To offset such a change it would then be necessary to effect an adjustment of the brake mechanism to restore the travel of the brake operating mechanism to its initial condition. The linkage system, however, is so arranged that the right end of the lever assembly 15 does not move even though misalignment of the brake wheel with respect to the designed center line of the brake may exist.

This will be appreciated from a consideration of the respective lever arms for the condition in which the brake wheel is moved to the right of the designed center line of the brake. Under this condition, both brake arm assemblies will be rotated in a clockwise direction as viewed. Consequently, both pins 16 and 17 will move upwardly, and the ratio of the movement of the pin 16 to the pin 17 will be proportional to the ratio of the dimension $y$ to the dimension $x$, illustrated in the drawing. If this ratio is properly selected, the distance traveled by each pin will correspond to the distance between the sides of an angle subtended by the angular movement of the lever system 15, which angle has its vertex at the right end of the lever system.

This may be realized as follows: When the lever assembly 15 is rotated about its right end, the pins 16 and 17 move an amount corresponding to the ratio $y'$ to $x'$ of the respective moment arms $y'$ and $x'$. Consequently, if the ratio of $y$ to $x$ is made equal to the ratio of $y'$ to $x'$, any movement of the wheel to the right or to the left of the designed center line will result in a rotation of lever assembly 15 about its right end, and the point to which the force is applied to obtain braking torque will remain stationary and the adjustment or calibration of the brake will not be changed.

The brake is applied by applying a downward force to the right end of lever assembly 15 along the line of action P. To release the brake with the construction provided, an upward force is applied to this same point. Because of the friction produced by the spring pressure engaging the respective levers of the lever assembly, and the brake arm assembly with friction plate 20, upward force on the right end of the lever assembly 15, rotating this lever assembly in a counter-clockwise direction will tend to move the brake arm assembly 2 angularly at the same time the brake arm assembly 3 is moved angularly in directions to lift the brake shoes from the wheel. The releasing torque, which moves brake arm assembly 2 away from the brake wheel, is applied thereto through the mentioned frictional connection between the lever assembly 15 and the brake arm assembly 2. Since there is no restraining force on this brake arm assembly, other than bearing friction, for this direction of movement, it will be appreciated that a relatively small frictional force will be sufficient to accomplish this end.

The pin 17, as indicated by dimensions designated $x$, is disposed midway between the respective brake arm pivot pins 4 and 6, and inasmuch as rotation of the lever assembly 15 takes place about the axis of the pin 4 during brake releasing movement, it will be appreciated that both brake shoes are moved, in the same amount, away from the brake wheel 8.

With the lever arrangement illustrated, a downward force such as P on the right end of lever assembly 15 produces equal and opposite forces on the brake shoes. Taking moments about the respective pins 16 and 17, the downward force on pin 17 is equal to:

$$\frac{Py'}{y'-x'}$$

The upward force on pin 16 is:

$$\frac{Px'}{y'-x'}$$

The counter-clockwise torque on the brake arm 3 is:

$$\frac{Py'x}{y'-x'}$$

The clockwise torque on brake arm 2 is:

$$\frac{Px'y}{y'-x'}$$

The ratios of these torques will be:

$$\frac{\frac{Py'x}{y'-x'}}{\frac{Px'y}{y'-x'}} = \frac{Py'x}{Px'y}$$

Since, as earlier described herein, the ratio of $y$ to $x$ was made equal to the ratio of $y'$ to $x'$, it will be appreciated that the product of these inversely related ratios in the final expression, will be unity, which indicates that the torques are equal.

The braking and releasing torques are applied to the right end of the lever assembly 15 by means of a spindle 26, which is threaded at 27 over a lower portion thereof and terminated in a reduced diameter section having a threaded extremity which clears through a suitable hole in a cross member 28, which is pivotally connected between the lever sections 15a and 15b at their right ends. The spindle is secured against axial movement with respect to cross member 28 by means of a nut 29, which threads thereover and is pinned in position by means of a pin 30. This connection is such as to provide a slight frictional restraint or preferably a sufficient restraint to rotative movement that operation of the brake and attendant vibration and other forces acting on the spindle, will not cause the spindle to rotate.

Figure 3:
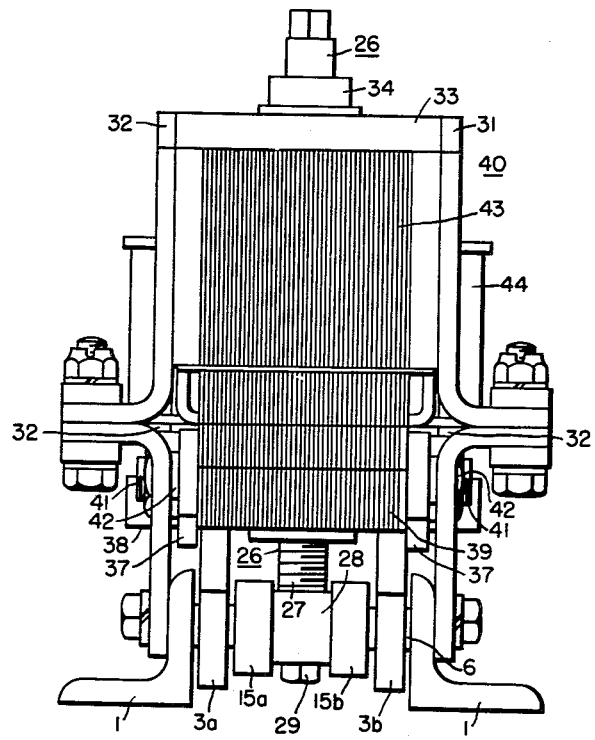
Figure 3 is an end view of the brake assembly of Figure 1, as viewed from the right end of the brake, which illustrates certain other detailed features of the brake linkage and general construction.

Spindle 26 projects upwardly between a pair of vertical supports 31 and 32, which are secured to the outside faces of the vertical flanges of the respective base angles. A cross piece 33, having a threaded hole therein is connected between the upper extremities of the supports 31 and 32 and spindle 26 projects through the hole. A threaded bushing 34 having a hole therethrough of larger diameter than the spindle 26 is disposed about the spindle and threads through the mentioned threaded hole in cross piece 33. At its bottom end, bushing 34 terminates in a conical face, which receives a correspondingly shaped cavity in the upper face of a spring washer 35 and centers the washer 35 with respect to bushing 34. Spring washer 35 also clears spindle 26 to the same extent as bushing 34. Spindle 26 at threaded portion 27, threads through a cross member 36, which is pivotally mounted between a pair of levers 37, which are pivotally mounted at their left hand ends by a pin 38, between the vertical supports 31 and 32. The right end of levers 37 support an armature 39 of an electromagnetic operator, generally designated 40. The armature member is supported between the levers 37 on a pin 41, having threaded ends extending through the levers. Nuts 42 on these threaded ends lock the armature in fixed angular relation with respect to the levers 37. This fixed angular relation is determined by moving the armature upwardly into engagement with the extremities of the poles of the core 43 of the electromagnet. This is the fixed position which the armature will occupy when the electromagnet is energized, and consequently, in this relative angular position of the levers and armature, a secure connection may be made. A coil 44, which surrounds the central leg of the core and which surrounds the end of the armature which enters the core section adjacent this central leg is utilized to produce the magnetomotive force for attracting the armature. As indicated by the laminations in either of Figures 2 or 3, this electromagnet is adapted for alternating-current energization. However, it is to be understood that either alternating-current or direct-current electromagnets may be employed to operate the lever system in the brake releasing direction.

As seen in Figure 1, a spring washer 46, is loosely fitted about spindle 26 and seats on the cross member 36. Suitable flanges or spring seats are provided on the respective spring washers 35 and 46 to receive the ends of a compression spring 47 therebetween. From the physical arrangement of the illustrated parts, since the upper spring washer 35 is secured against vertical movement, the force of the compression spring will act upon the cross member 36. If the electromagnet is deenergized, this spring force drives the spindle 26 downwardly and consequently drives the right end of the lever system 15 downwardly. This direction of movement of the free extremity of the lever system as previously described applies the brake shoes against the brake wheel 8, to apply the braking torque. When it is desired to release the brake, the electromagnet 40 is energized. The magnetic force, if the limit of travel is not exceeded, is sufficient to overcome the spring force. Lever assembly 37 is therefore rotated in a counter-clockwise direction about pin 38, lifting the spindle 26 and the right end of the lever system 15 connected thereto. The resulting counter-clockwise rotation of lever system 15 about the axis of pin 4 results in angular displacement of brake arms 2 and 3 in a direction to move the brake shoes equal distances from the brake wheel. Torsion springs 48 are disposed about the circular ends 49 of cross member 36, one end of each torsion spring engages a respective pin 50, which pins are located in the vertical supports 31 and 32, respectively. The other end of each torsion spring engages a pin 51, which extends between the levers 37. The arrangement is such that the ends of the respective torsion springs exert forces upwardly against the respective pins 50 and 51, and exert a downward force on the cross member 36. Thus, the cross member 36 is continuously biased downwardly in its bearings in the levers 37 and the pivot end of levers 37 are biased downwardly on pivot pin 38. Thence, the slack, due to lost motion in this direction in the bearing connections, is taken up.

Because the center of cross member 36 moves in an arc of small radius as compared to the larger arc of movement of cross piece 28, spindle 26 must be free to move laterally to a small extent in the spring and bushing assembly. Provision for this is had in the clearance holes in bushing 34 and washers 35 and 46, respectively.

By turning the spindle 26 to vary the distance between the geometric center of cross member 36 and the geometric center of cross member 28, the travel of the armature of the electromagnet can be adjusted to an amount sufficient to move the brake shoes away from the brake wheel. This can be accomplished whether the electromagnet is energized or deenergized. If the electromagnet is deenergized, a condition of normal travel can be indicated on the frame of the brake by means of a suitable mark such as 52, which is arranged on the brake frame at the end of levers 37. A screw 53, having its center on the longitudinal center line of levers 37 and having its slot aligned with this longitudinal center line, may serve as a marker on the lever. With the electromagnet deenergized, the spindle 26 may be rotated until the slot in the screw 53 is aligned with mark 52. This may be termed the condition of normal travel for the armature. The limit of travel for the armature may be indicated by a second mark 54, which will serve as a visual indication to the operator of the brake that readjustment of the brake to compensate wear of the brake shoe lining is required. When the armature travel has reached the mark 54, a wrench may be applied to the upper end of spindle 26. The spindle is then rotated in a clockwise direction, as viewed from the top. The thread illustrated on the spindle is a right-hand thread and consequently, the cross member 36 is moved upwardly along the spindle. Since the left end of the levers 37 is fixed on pivot pin 38, this displacement of cross member 36 elevates the armature of the electromagnet until such time as the slot of screw 53 is again aligned with the mark 52, which is the normal travel position of the armature. If the electromagnet is energized and the brake wheel is rotating, the spindle or adjusting screw 26 is turned clockwise, as viewed from above, until the shoes rub on the wheel. Then the spindle is turned back sufficiently to adequately clear the shoes of the wheel. This adjustment can actually be made by sense of feel.

Other means, such as a switch, not shown, may be disposed adjacently from system 37 to be actuated thereby when the limit of travel is reached. Such a switch may be utilized to energize either an audible or visual electrical indicating system, which would warn the operator that the brake again required adjustment. Such expedients are believed to be well within the scope of those skilled in the art.

Since the equalization of shoe clearance is accomplished by the connection of the lever system 15 with the respective brake arm assemblies, the only operation required for readjusting the brake is that involved in rotating the spindle 26.

With the same adjustment, it is also possible to release the brakes mechanically for installation or repair purposes. If the spindle 26 is turned counter-clockwise, as viewed from above, the armature will be dropped. This downward travel of the armature may be stopped at any desired point by the insertion of a stop, which blocks the downward movement of the lever 37. When this downward movement is stopped, the downward movement of the cross member 36 connected between the levers 37 is also stopped. Consequently, any further movement of the spindle 26 in a counter-clockwise direction will now raise the cross member 28, which lifts the right end of the lever system 15. This movement is in the same direction as that afforded by energization of the electromagnet, and the lever system pivots about the pin 4 to release the brake shoes from the wheel.

In view of the fact that levers 37 are secured for pivotal movement about the fixed pin 38 and carry the armature 39 at their other extremities, it will be appreciated that the armature moves through a definite arcuate path, about the fixed pin 38. This arrangement prevents any tendency for the shoe lining wear to produce a side pull on the armature of the electromagnet as usually caused by excessive wear on these parts.

The structure as illustrated, is assembled from simple structural parts, which required a minimum of machining. Thus, the costs of manufacture are low compared with the character of performance provided by the brake. Moreover, the provision of the unique single point of adjustment of the brake which requires no skill to make, reduces the maintenance problem considerably and consequently, the brake is more apt to be properly maintained. The provision of the mechanical release in the linkage involving the spindle 26 facilitates installation and, as previously explained, misalignment of the brake wheel with respect to the designed vertical center line of the brake, has little or no effect on the adjustment of the brake.

A brake such as herein disclosed may be equipped with a weatherproof housing, which need not be taken off to readjust the brake. The armature indicator can be made to project out of the slot in the lower part of such a brake housing or as herein suggested can be utilized to operate a remote indicator of the condition of the brake. In such an arrangement, the adjusting screw or spindle 26 projects through the top of the housing.

It should be noted that a lever assembly 15, such as herein illustrated, although preferred from the viewpoint of structural symmetry and load distribution in the linkage system, is not essential to operate the system. A single lever may be employed with equal facility. Moreover, such a lever need not be a straight bar, but may be of such configuration as to pass beneath the brake arm pivot pins 4 and 6; for example, with a suitable upward projection thereon, to mount the pin 17. Additionally, the point of frictional connection between the lever assembly 15 and the brake arm assembly 2 need not be made adjacent the axis of brake arm pivot pin 4, as illustrated, but actually may be made at any point between the lever system 15 and brake arm assembly 2, including the axis of pin 16. The only requirement here is that sufficient frictional restraint against relative angular movement between lever system 15 and brake arm assembly 2 be provided to prevent relative angular movement when the brake is moved to released position.

These and other structural variations will be readily apparent to those skilled in the art. Accordingly, it is intended that the foregoing disclosure and the showings made in the drawings, shall be considered only as illustrative of the principles of this invention and not interpreted in a limiting sense.

I claim as my invention:

1. A brake assembly for controlling rotative movement of a brake wheel, comprising, a pair of pivotally mounted brake arms, a brake shoe mounted on each brake arm, a movable brake actuating lever assembly including a lever pivotally connected to each brake arm at a point on each brake arm displaced from the points of pivoting of the respective brake arms, and friction means frictionally engaging said lever with one brake arm at a point adjacent the point of pivoting of said one brake arm, said friction means restraining relative angular displacement between said lever and said one brake arm throughout brake releasing movement of said one brake arm.

2. A brake assembly for controlling rotative movement of a brake wheel, comprising, a pair of pivotally mounted brake arms, a brake wheel engaging brake shoe mounted on each brake arm, a movable brake actuating lever assembly including a lever pivotally connected to each brake arm at a point on each brake arm displaced from the points of pivoting of the respective brake arms, a friction plate disposed between said lever and one brake arm, means supporting said friction plate to prevent movement of said friction plate from its position between said one brake arm and said lever, and spring means biasing said lever and said one brake arm into engagement with said friction plate, the friction forces restraining relative angular movement between said lever and said one brake arm throughout brake releasing movement of said lever.

3. A brake assembly for controlling rotative movement of a brake wheel, comprising, a pair of pivotally mounted brake arms, a brake wheel engaging brake shoe mounted on each brake arm, a brake actuating lever assembly including a lever pivotally connected to each brake arm at a point on each brake arm displaced from the point of pivoting of the respective brake arms, and a friction connection between one brake arm and said lever, said friction connection restraining relative angular movement between said lever and said one brake arm throughout brake releasing movement of said lever.

4. A brake assembly, comprising, a base, a brake wheel, a pair of brake arms pivotally connected to said base on opposite sides of said wheel, a brake shoe connected to each brake arm, a brake actuating lever assembly including a lever extending along said base and pivotally engaging each brake arm at a point on each brake arm displaced from the point of pivotal mounting of the respective brake arms on the base, and a friction connection between one brake arm and said lever having a friction force sufficient to effect angular movement of said one brake arm upon angular movement of said lever in all positions of said lever in which the brake shoe on said one brake arm is released from said brake wheel.

5. A brake assembly, comprising, a base, a brake wheel, a pair of brake arms pivotally connected to said base on opposite sides of said wheel, a brake shoe connected to each brake arm, a lever extending along said base and pivotally engaging each brake arm at a point on each brake arm displaced from the point of pivotal mounting of the respective brake arms on the base, a friction connection between one brake arm and said lever having a friction force sufficient to effect angular movement of said one brake arm upon angular movement of said lever over the range of brake released positions of said one brake arm, brake operating means mounted on said base and having a movable member connected to said lever to operate said lever, and adjusting means connected between said lever and said movable member for adjusting the connection between said movable member and said lever to vary the distance therebetween to control the travel of said movable member.

6. A brake assembly, comprising, a base, a brake wheel, a pair of brake arms pivotally connected to said base on opposite sides of said wheel, a brake shoe connected to each brake arm, a lever extending along said base and pivotally engaging each brake arm at a point on each brake arm displaced from the point of pivotal mounting of the respective brake arms on the base, a friction connection between one brake arm and said lever having a friction force sufficient to effect angular movement of said one brake arm upon angular movement of said lever, an operating lever pivotally mounted on said base, and a threaded spindle pivotally connected with one lever and threadedly connected with the other lever, said spindle being rotatable about its axis to vary the relative position of said levers therealong.

7. A brake assembly, comprising, a base, a brake wheel, a pair of brake arms pivotally connected to said base on opposite sides of said wheel, a brake shoe connected to each brake arm, a lever extending along said base and pivotally engaging each brake arm at a point on each brake arm displaced from the point of pivotal mounting of the respective brake arms on the base, a friction connection between one brake arm and said lever having a friction force sufficient to effect angular movement of said one brake arm upon angular movement of said lever, an operating lever pivotally mounted on said base, a threaded spindle pivotally connected with one lever and threadedly connected with the other, and spring means biasing said operating lever in one direction.

8. A brake assembly, comprising, a base, a brake wheel, a pair of brake arms pivotally connected to said base on opposite sides of said wheel, a brake shoe connected to each brake arm, a lever extending along said base and pivotally engaging each brake arm at a point on each brake arm displaced from the point of pivotal mounting of the respective brake arms on the base, a friction connection between one brake arm and said lever having a friction force sufficient to effect angular movement of said one brake arm upon angular movement of said lever, an operating lever pivotally mounted on said base, a threaded spindle pivotally connected with one lever and threadedly connected with the other, spring means biasing said operating lever in one direction, and a magnet means having an armature connected with said operating lever for biasing said operating lever in the other direction.

9. A brake assembly for controlling rotative movement of a brake wheel comprising, a support, a pair of spaced brake arm pivots on said support, respective brake arms pivotally mounted on said brake arm pivots, a brake shoe on each brake arm, a brake actuating lever assembly including a lever, a first pivotal connection between said lever and one brake arm at a point on said one brake arm displaced from the brake arm pivot therefor, a second pivotal connection between said lever and the other brake arm at a point on said other brake arm displaced in substantially the same direction from the brake arm pivot therefor as the direction of displacement of said first pivotal connection from the brake arm pivot of said one brake arm, and friction pivot means slidably frictionally engaging said lever with said support between said first and second pivotal connections, said friction pivot means preventing translational movement of said lever with respect to said support over the range of brake releasing angular positions of said lever and permitting said translational movement in the presence of brake applying forces.

10. A brake assembly for controlling rotative movement of a brake wheel comprising, a support, a pair of spaced brake arm pivots on said support, respective brake arms pivotally mounted on said brake arm pivots, a brake shoe on each brake arm, a brake actuating lever assembly including a lever, a first pivotal connection between said lever and one brake arm at a point on said one brake arm displaced from the brake arm pivot therefor, a second pivotal connection between said lever and the other brake arm at a point on said other brake arm displaced in substantially the same direction from the brake arm pivot therefor as the direction of displacement of said first pivotal connection from the brake arm pivot of said one brake arm, and friction pivot means having a pivot axis substantially coinciding with that of said brake arm pivot disposed between said first and second pivotal connections and including at least one friction member slidably frictionally engaging said lever with said support, said friction pivot means preventing translational movement of said lever with respect to said support over the range of brake releasing angular positions of said lever and permitting said translational movement in the presence of brake applying forces.

11. A brake assembly, comprising, a support, a brake wheel, a pair of brake arms pivotally connected to said support on opposite sides of said brake wheel, a brake shoe connected to each brake arm, a brake actuating lever assembly including a lever pivotally engaging each brake arm at a point on each brake arm displaced from the point of pivotal connection of the respective brake arms on said support, and friction pivot means having a pair of relatively slidable contiguous friction faces pivotally mounting said lever on said support between the points of pivotal engagement of said lever and said brake arms, said contiguous faces relatively sliding in the presence of braking forces on said lever permitting translational movement of said lever relative to said support and preventing such translational movement in the presence of brake releasing forces on said lever.

12. A brake assembly, comprising, a support, a brake wheel, a pair of brake arms pivotally connected to said support on opposite sides of said brake wheel, a brake shoe connected to each brake arm, a brake actuating lever assembly including a lever pivotally engaging each brake arm at a point on each brake arm displaced from the point of pivotal connection of the respective brake arms on said support, and means frictionally engaging said lever with one of said brake arms to provide a torque transmitting connection therebetween which slips when the brake shoe on said one brake arm is applied to said brake wheel by angular displacement of said lever.

13. A brake assembly comprising, a support, a brake wheel, a lever, friction pivot means pivotally mounting said lever on said support and permitting translational movement of said lever with respect to said friction pivot means, a pair of brake shoes disposed on opposite sides of said brake wheel, and means connecting said brake shoes to said lever on opposite sides of said friction pivot means.

14. A brake assembly comprising, a support, a brake wheel, a lever, friction pivot means pivotally mounting said lever on said support and permitting translational movement of said lever with respect to said friction pivot means, a pair of brake shoes, and brake shoe support means pivotally connecting said brake shoes to said lever on opposite sides of said friction pivot means.

15. A brake assembly comprising, a support, a brake wheel, a lever, friction pivot means pivotally mounting said lever on said support and permitting translational movement of said lever with respect to said friction pivot means, a pair of brake shoes, and brake shoe support means pivotally connecting said brake shoes to said lever at points displaced from said friction pivot means.

16. A brake assembly comprising, a support, a brake wheel, a lever, friction pivot means pivotally mounting said lever on said support and permitting translational movement of said lever with respect to said friction pivot means, a pair of brake shoes, and brake shoe support means pivotally connecting said brake shoes to said lever at points displaced from said friction pivot means, translational movement of said lever being restrained by said friction pivot means during lever movement about said friction pivot to release said brake shoes from said brake wheel and translational movement of said lever occurring with lever movement in a direction to apply said brake shoes to said wheel upon engagement of one brake shoe with said brake wheel ahead of the other, said lever pivoting at the point of engagement thereof with the brake shoe support means supporting said one brake shoe and sliding with respect to said pivot means so that the point of connection of the other brake shoe support means continues moving to apply the other brake shoe to said brake wheel.

References Cited in the file of this patent
UNITED STATES PATENTS

| | | |
|---|---|---|
| 2,514,378 | Currie | July 11, 1950 |
| 2,685,945 | Currie | Aug. 10, 1954 |